(12) United States Patent
Kobayashi

(10) Patent No.: US 6,792,223 B2
(45) Date of Patent: Sep. 14, 2004

(54) IMAGE FORMING APPARATUS FOR REDUCING A SYSTEM RETURN TIME

(75) Inventor: Kazunori Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/352,594

(22) Filed: Jan. 29, 2003

(65) Prior Publication Data

US 2003/0142989 A1 Jul. 31, 2003

(30) Foreign Application Priority Data

Jan. 30, 2002 (JP) .......................... 2002-022402
Mar. 8, 2002 (JP) .......................... 2002-064152

(51) Int. Cl.[7] .................. G03G 15/00; G03G 15/20
(52) U.S. Cl. ...................... 399/70; 399/75; 399/77
(58) Field of Search ........................ 399/8, 67, 69, 399/70, 75–78

(56) References Cited

U.S. PATENT DOCUMENTS 4,980,814 A * 12/1990 Hosaka et al. .............. 399/8
6,415,351 B1 7/2002 Kobayashi et al. .......... 711/103
6,513,113 B1 1/2003 Kobayashi .................. 713/2

* cited by examiner

*Primary Examiner*—William J. Royer
(74) *Attorney, Agent, or Firm*—Oblon, Spivak, McClelland, Maier & Neustadt, P.C.

(57) ABSTRACT

An image forming apparatus can reduce a system return time by reducing a time required for initialization of peripheral control integrated circuits according to a control program and achieves a low-power consumption so as to improve convenience for a user. A CPU performs a control of the image forming apparatus. A control bus for address and data is controlled by the CPU. A memory is connected to the control bus and is configured to store a control program of the CPU. A reset IC initializes the CPU when a power is turned on. A peripheral control ASIC controls each part of the image forming apparatus in accordance with an instruction of the CPU. An exclusive control bus is connected to the peripheral control ASIC. An operation of the exclusive control bus is started according to an input from the reset IC so as to perform an initializing process of the peripheral control ASIC.

18 Claims, 20 Drawing Sheets

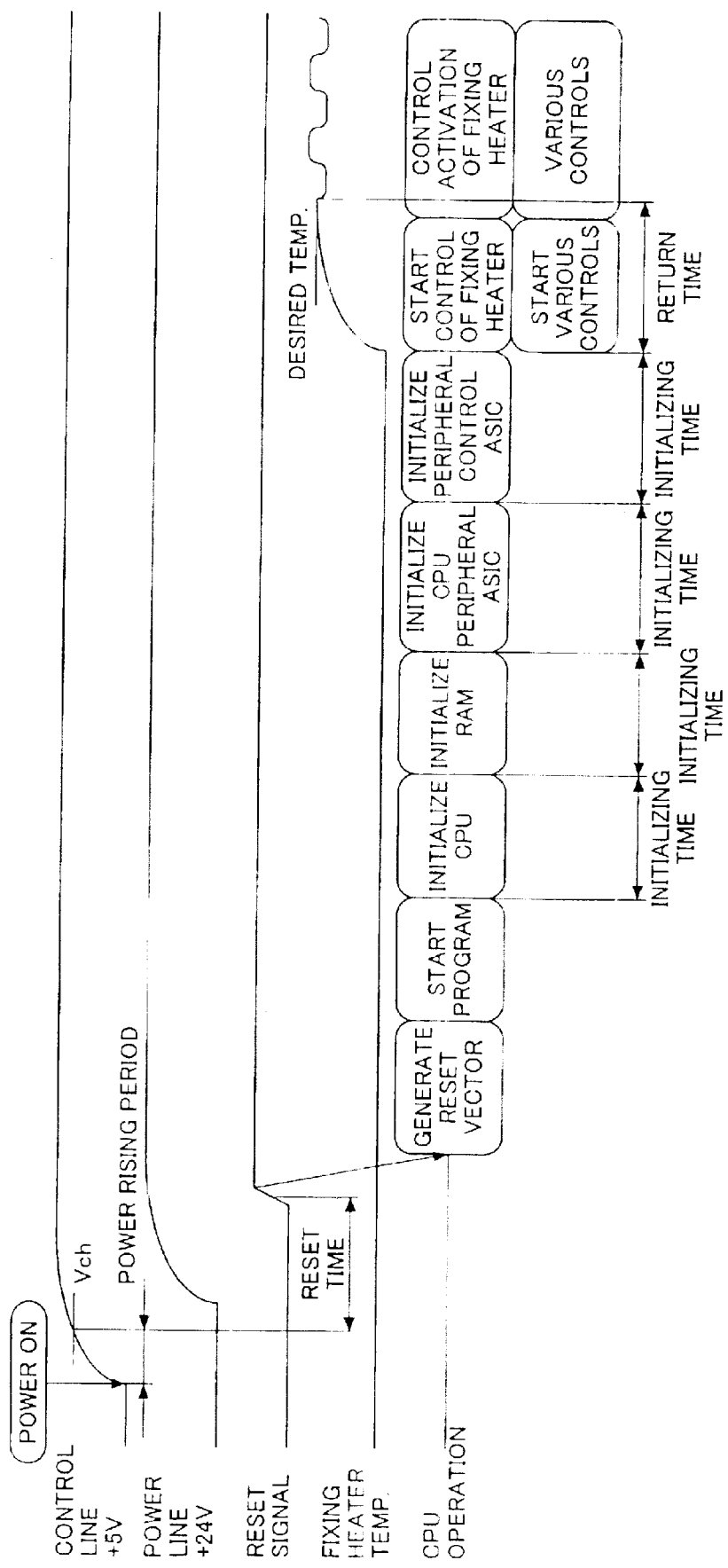

FIG.5 PRIOR ART

| ITEMS | REQUIRED TIME | |
|---|---|---|
| | RETURN TIME OF FIXING HEAT IS LONG | RETURN TIME OF FIXING HEAT IS SHORT |
| POWER RISING TIME | 1.0s | 1.0s |
| RESET TIME | 100ms | 100ms |
| CPU INITIALIZING TIME | 500ms | 500ms |
| RAM INITIALIZING TIME | 500ms | 500ms |
| CPU PERIPHERAL ASIC INITIALIZING TIME | 1.0s | 1.0s |
| PERIPHERAL CONTROL ASIC INITIALOZING TIME | 1.0s | 1.0s |
| FIXING HEATER RETURN TIME | 50s | 5.0s |
| TOTAL | 54.1s | 9.1s |
| CONTRIBUTION RATE OF PERIPHERAL CONTROL ASIC INITIALIZING TIME TO SYSTEM RETURN TIME | 1.0s/54.1s=1.8% | 1.0s/9.1s=11.0% |

FIG.8

| ITEMS | REQUIRED TIME | |
|---|---|---|
| | CONVENTIONAL PROCESS | PRESENT INVENTION |
| POWER RISING TIME | 1.0s | 1.0s |
| RESET TIME | 100ms | 100ms |
| CPU INITIALIZING TIME | 500ms | 500ms |
| RAM INITIALIZING TIME | 500ms | 500ms |
| CPU PERIPHERAL ASIC INITIALIZING TIME | 1.0s | 1.0s |
| PERIPHERAL CONTROL ASIC INITIALOZING TIME | 1.0s | – |
| FIXING HEATER RETURN TIME | 5.0s | 5.0s |
| TOTAL | 9.1s | 8.1s |

FIG.15

| ITEMS | REQUIRED TIME | |
|---|---|---|
| | CONVENTIONAL PROCESS | PRESENT INVENTION |
| POWER RISING TIME | 1.0s | 1.0s |
| RESET TIME | 100ms | 100ms |
| CPU INITIALIZING TIME | 500ms | 500ms |
| RAM INITIALIZING TIME | 500ms | 500ms |
| CPU PERIPHERAL ASIC INITIALIZING TIME | 1.0s | 1.0s |
| PERIPHERAL CONTROL ASIC INITIALOZING TIME | 1.0s | — |
| FIXING HEATER RETURN TIME | 5.0s | 5.0s |
| TOTAL | 9.1s | 8.1s |

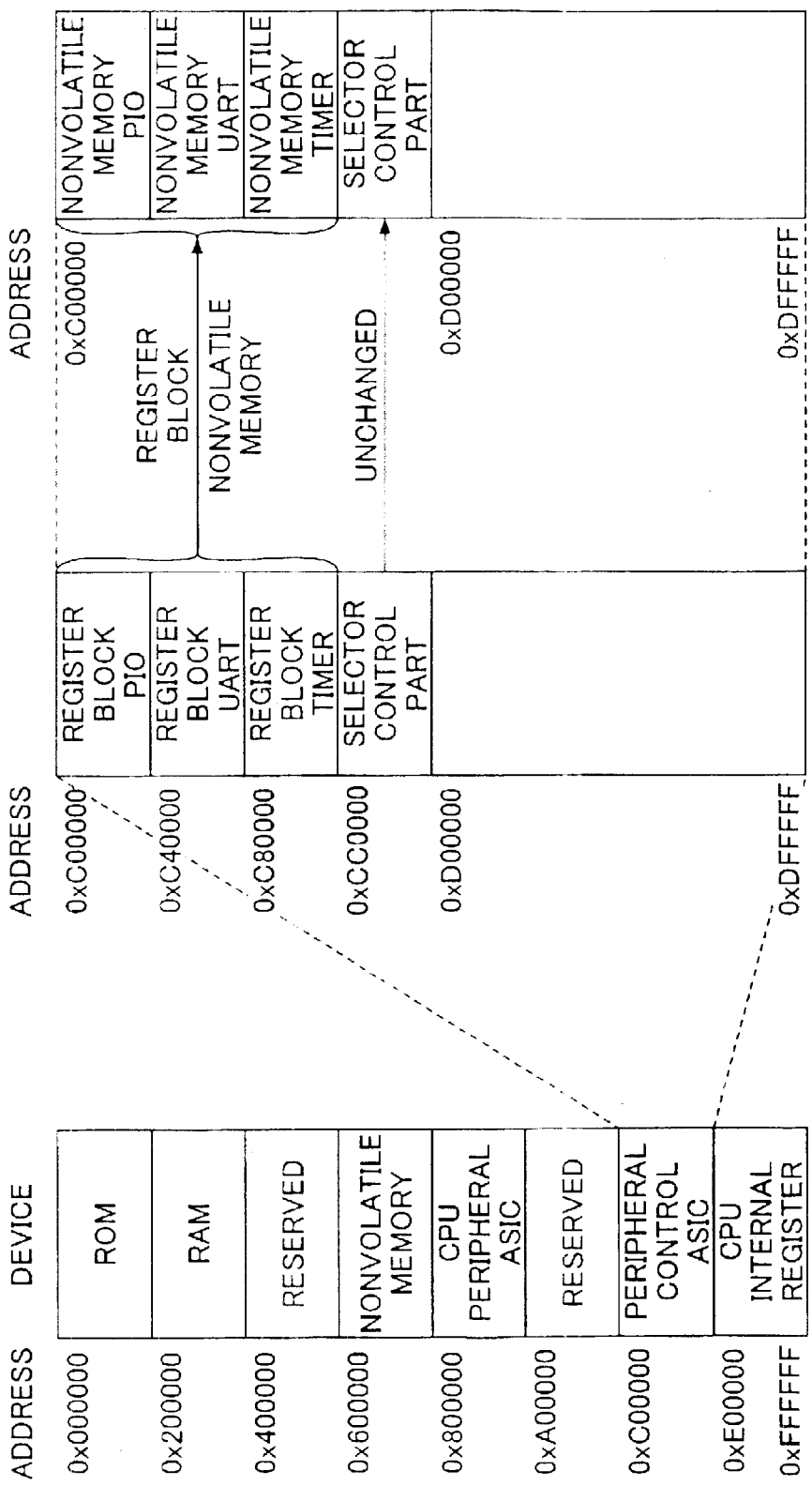

IMAGE FORMING APPARATUS FOR REDUCING A SYSTEM RETURN TIME

CROSS-REFERENCE TO RELATED APPLICATIONS

The present application is based on Japanese priority application Nos. 2002-022402 filed Jan. 30, 2002, and No. 2002-064152 filed Mar. 8, 2002, the entire contents of which are incorporated by reference herein.

BACKGROUND OF THE INVENTION

1. Field of the Invention

The present invention generally relates to image forming apparatus and, more particularly, to an image forming apparatus such as a digital copy machine or a digital printer that has a nonvolatile memory.

2. Description of the Related Art

In recent years, power-saving function is strongly required for image forming apparatuses from a viewpoint of environmental protection. In a conventional image forming apparatus using an electrophotographic process, the power consumption of a fixing part is dominant. A system, which realizes the power-saving function by maintaining a fixing part to a temperature lower than a temperature at the time of operation or interrupting power supply to the fixing part in a standby state, is widely used.

Recently, the power-saving technology has progressed further, and a system that interrupts power supply not only to the fixing part but the entire system or a large part of the system has been used. In this case, the power consumption at the time of standby becomes several watts or less, and an image forming apparatus having a very large power-saving effect can be achieved.

On the other hand, in consideration of convenience, a return time from a standby state is a very important element. That is, there are many cases where an image forming apparatus cannot be used immediately since the image forming apparatus is in the process of returning from a standby state, thereby deteriorating convenience very much.

In a case where the power-saving function in the standby state is achieved mainly by a temperature control of a fixing part, measures have been taken for an increase in efficiency of a heater, a formation of a thinner fixing roller and a reduction in the return time in association with other mechatronics parts. Consequently, the return time of a fixing part has been improved to the level of several minutes to the level of several seconds. On the other hand, generally in many cases, it takes several seconds to initialize a control part mainly containing a central processing unit (CPU).

In the case of the system which interrupts the power supply to the entire system or a large part of the system, if the return time is several minutes or several tens of seconds, the time of several seconds required for initialization is a negligibly short time with respect to the entire return time from a standby state. For this reason, there is no need to take the time required for initializing the control part into consideration.

However, in the recent image forming apparatus having the return time of a fixing part becoming the level of several seconds, several seconds required for initializing a control part influences greatly to the return time of the system.

It should be noted that, in the present specification, the term "fix" is used to represent an operation of fusing toner attached on a transfer sheet so as to securely bond the toner to the surface of the transfer sheet after cooling the fused toner. The fixing part may be referred to as a "fuser" in the field to which the present invention is related.

Hereafter, the initialization of the control part is explained.

FIG. 1 is a block diagram of a digital copy machine as a conventional image forming apparatus. Image data obtained by a read control part 1 is sent to a write control part 4 after image processing is applied by an image processing part (not shown in the figure) of a main control part 3. The write control part 4 controls a laser diode (not shown in the figure) based on the image data sent from the image processing part, and forms an electrostatic latent image in an electrophotography process part 5.

On the other hand, a toner image developed by the electrophotography process part 5 is transferred onto a transfer paper having been conveyed from a paper feed part (not shown in the figure). The toner image is fixed on the transfer paper by a fixing part (not shown in the figure) heated by a fixing heater 6, and a copy 7 is formed. The fixing heater 6 is controlled by the main control part 3, an IO control part 8 and a fixation control part 9 so that the fixing part is always maintained at a desired temperature during operation.

Additionally, in order to reduce the power consumption of the system at the time of standby, the fixing heater 6 is maintained at a temperature lower than that of operation, or the power supply to the fixing heater 6 is interrupted during the standby. Further, in the case of a system which interrupts the power supply to the entire system or a large part of the system, the power supply is interrupted not only to the fixing heater 6 but also to the main control part 3, the IO control part 8, and the fixation control part 9.

It should be noted that the digital copy machine shown in FIG. 1 is provided with, other than the above-mentioned parts, an operation part 10, an auto-document feeder (ADF) 11, a paper feed bank (BNK) 12, sensors 13, a clutch/solenoid (CL&SOL) 14 and a power source 15.

FIG. 2 is a block diagram of the main control part 3 and the IO control part 8 of the digital copy machine shown in FIG. 1. After a power is turned on, a central processing unit (CPU) 21 starts a series of operations upon cancellation of a reset signal generated by a reset integrated circuit (IC) 22 in accordance with a control program stored in a read only memory (ROM) 23. A random access memory (RAM) 24 is used as a work area of the control program. Adjustment data of the image forming apparatus, history of use, and the like are stored in a nonvolatile memory 25, and the stored data is used for maintenance. Since the CPU 21 has a general-purpose specification, the control program initializes the CPU 21 first after start of the operation. Additionally, since there are many cases where the contents of the RAM 24 are unfixed immediately after a power is turned on, the RAM 24 is initialized according to ALL"0" or ALL"1" write after the initialization of the CPU 21. Further, since a CPU peripheral ASIC 26 and a peripheral control ASIC 31 also have a general-purpose specifications, the CPU peripheral ASIC 26 and the peripheral control ASIC 31 are initialized after the initialization of the RAM 24.

Here, a description will be given of the peripheral control ASIC 31 in detail. The peripheral control ASIC 31 is mounted on a substrate different from a substrate on which the CPU 21 and the ROM 23 are mounted. For this reason, the peripheral control ASIC 31 is connected to an exclusive control bus separated from a CPU bus by the CPU peripheral ASIC 26 for the purpose of reduction in a load applied to buses.

The interfaces (I/F) of the I/O system, such as the ADF 11, the bank 12, the sensors 13, the clutch/solenoid 14, and the fixation control part 9, are mainly connected to the peripheral control ASIC 31. In order to make the general-purpose function of the peripheral control ASIC 31 correspond to the interfaces, it is necessary to perform an input setup, an output setup, and a serial communication setup.

FIG. 3 is a block diagram of the peripheral control ASIC 31. The peripheral control ASIC 31 comprises a functional block 41, a register block 423 and a CPU I/F 43. The functional block 41 realizes each function such as a PIO, a UART, or a timer. The register block 42 performs various settings and operation control to the functional block 41. The CPU I/F 43 is connected to control buses such as an address data bus or a data bus so as to perform an internal address decode and an access control to the register block 42.

A description will be given below of the PIO as an example. Normally, all terminals of the PIO are set as input control ports by the register block 42 and I/O terminals are in a Hi-Z state so that a-control signal to a load is not turned active due to an unexpected output at a time of reset and after cancellation of the reset. The control signal to a load, which is desired to be inactive at the time of reset and after the cancellation of the reset, can be inactive by pulling up or pulling down the I/O terminals.

The terminals to which an input load is connected are set as input terminals and the terminals to which an output load is connected are set as output terminals by setting the register block 42 by a CPU (not shown) through the CPU I/F 43 after cancellation of reset. Additionally, an initial value of an output, is set up so as to perform desired I/O operations.

Similar operations are sequentially performed with respect to the UART and the timer in the register block 42, and the initialization of the peripheral control ASIC 31 is completed. Further, in order to maintain safety, activation of a load such as the fixing heater 6 is started after the series of initializing operations are ended and confirmed that the there is no problem in the system operation. The fixing heater 6 is controlled so as to rapidly reach a desired setting temperature immediately after the activation. After the desired setting temperature is reached, the fixing heater 6 is controlled by monitoring temperature so as to be maintained at a constant temperature.

FIG. 4 is a time chart of a process from the series of initializing operations to the activation of the fixing heater 6. FIG. 5 is an illustration showing an example of time required for each operation shown in FIG. 4.

In FIG. 4, the process from the series of initializing operations to the activation of the fixing heater 6 is sequentially carried out based on the control program.

As shown in FIG. 5, the return time of the system is 54.1 seconds when the return time of the fixing heater 6 is short, and is 9.1 seconds when the return time of the fixing heater 6 is short. Here, a consideration is made of a rate of contribution of the initialization time of the peripheral control ASIC 31 to the system reset time is considered. When the reset time of the fixing heater 6 is long (54.1 s), the rate of contribution is 1.8% as shown in FIG. 5, and it can be considered that the reset time of the fixing heater 6 is negligible.

However, when the reset time of the fixing heater 6 is short (9.1 s), the rate of contribution is 11.0%, which is not negligible. When attempting further reduction in the system return time, the rate of contribution may be a bottleneck, which is an obstacle in improving convenience for a user.

It should be noted that Japanese Laid-Open Patent Application No. 6-210923 discloses a recording apparatus which can save a time spent on an initializing process when a power is turned on. In the recording apparatus, memory check data is written in a nonvolatile memory so as to check validity of the data. The nonvolatile memory of the recording apparatus disclosed in Japanese Laid-Open Patent Application No. 6-210923 is used for merely retaining data, and is not used for generating control bus data.

SUMMARY OF THE INVENTION

It is a general object of the present invention to provide an improved and useful image forming apparatus in which the above-mentioned problems are eliminated.

A more specific object of the present invention is to provide an image forming apparatus which can reduce a system return time by reducing a time required for initialization of peripheral control integrated circuits according to a control program and achieves a low-power consumption so as to improve convenience for a user.

In order to achieve the above-mentioned objects, there is provided according to one aspect of the present invention an image forming apparatus using an electrophotographic process to form an image, comprising: a processing unit performing a control of the image forming apparatus; a control bus for address and data, which is controlled by the processing unit; a memory connected to the control bus and storing a control program of the processing unit; a reset part initializing the processing unit when a power is turned on; a peripheral control part controlling each part of the image forming apparatus in accordance with an instruction of the processing unit; and an exclusive control bus connected to the peripheral control part, wherein an operation of the exclusive control bus is started according to an input from the reset part so as to perform an initializing process of the peripheral control part.

According to the above-mentioned invention, the operation of the exclusive control bus connected to the peripheral control part is started according to the input from the reset part which initializes the processing unit when power is turned on. Therefore, the initialization of the peripheral control part is performed in parallel to the initialization of other parts. Thereby, the time spent on the initialization of the peripheral control part by a control program is omitted from the time spent on the entire initialization process.

In the image forming apparatus according to the present invention, the exclusive control bus may be produced based on control information stored in a nonvolatile memory. Additionally, the exclusive control bus may be selectively connected to one of the control bus controlled by the processing unit and another control bus produced based on the control information stored in the nonvolatile memory. The nonvolatile memory may be constituted by a ferroelectric random access memory.

Additionally, there is provided according to another aspect of the present invention an image forming apparatus, comprising a processing unit controlling the entire image forming apparatus and an integrated circuit controlling peripheral parts in accordance with an instruction of a main control part, wherein the integrated circuit comprises: a functional block performing a predetermined function; a register block storing setting data to the functional block; and a nonvolatile memory storing initial values of the setting data to the functional block separately from the register block.

According to the above-mentioned invention, the integrated circuit for peripheral control parts is provided with the nonvolatile memory which is separate from the register block and stores the initial values of the setting data to the functional block. Thereby, the initialization of the integrated circuit for peripheral control parts according to a control program can be performed in parallel to the initialization of other parts. Therefore, the time spent on the initialization of the integrated circuit for peripheral control parts can be omitted from the time of the entire initialization, and the reset time of the system can be reduced.

The image forming apparatus according to the above-mentioned invention may further comprise a selector selecting one of the register block and the nonvolatile memory in accordance with an instruction supplied from the processing unit when a power is turned on, wherein the initial values of the setting data stored in the nonvolatile memory is are loaded to the register block. Additionally, the image forming apparatus may further comprise a selector control part controlling a selector which selects one of the register block and the nonvolatile memory to be accessed by the processing unit when an access is made from the processing unit to the integrated circuit, wherein the same address is given to the register block and the nonvolatile memory in the processing unit. The nonvolatile memory may be constituted by a ferroelectric random access memory.

Other objects, features and advantages of the present invention will become more apparent from the following detailed description when read in conjunction with the accompanying drawings.

BRIEF DESCRIPTION OF THE DRAWINGS

FIG. 4 is a time chart of a process from a series of initializing operations to an activation of a fixing heater;

FIG. 5 is an illustration showing an example of time required for each operation shown in FIG. 4;

FIG. 8 is an illustration showing an example of a time required for each operation in the process shown in FIG. 7;

FIG. 15 is an illustration showing an example of a time required for each operation in the process shown in FIG. 14;

FIG. 19 is a memory map of the entire CPU;

FIG. 20A is a memory map of the CPU with respect to a peripheral control ASIC when an access is made to a register block;

FIG. 20B is a memory map of the CPU with respect to a peripheral control ASIC when an access is made to a nonvolatile memory.

DETAILED DESCRIPTION OF THE PREFERRED EMBODIMENTS

First Embodiment

A description will now be given, with reference to the drawings, of a first embodiment of the present invention.

Figure 2:
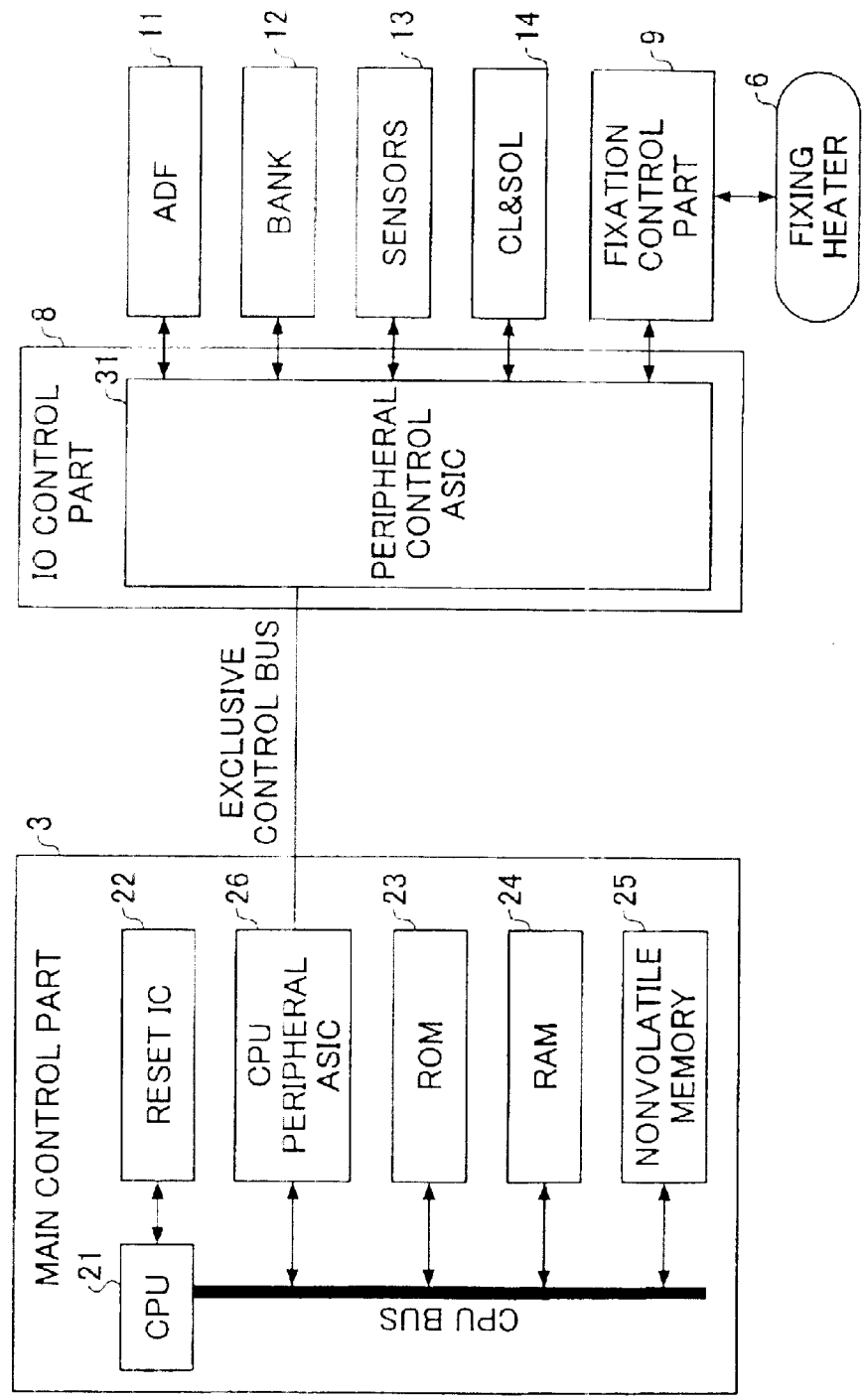
FIG. 2 is a block diagram of a main control part and an IO control part of the digital copy machine shown in FIG. 1.
Figure 3:
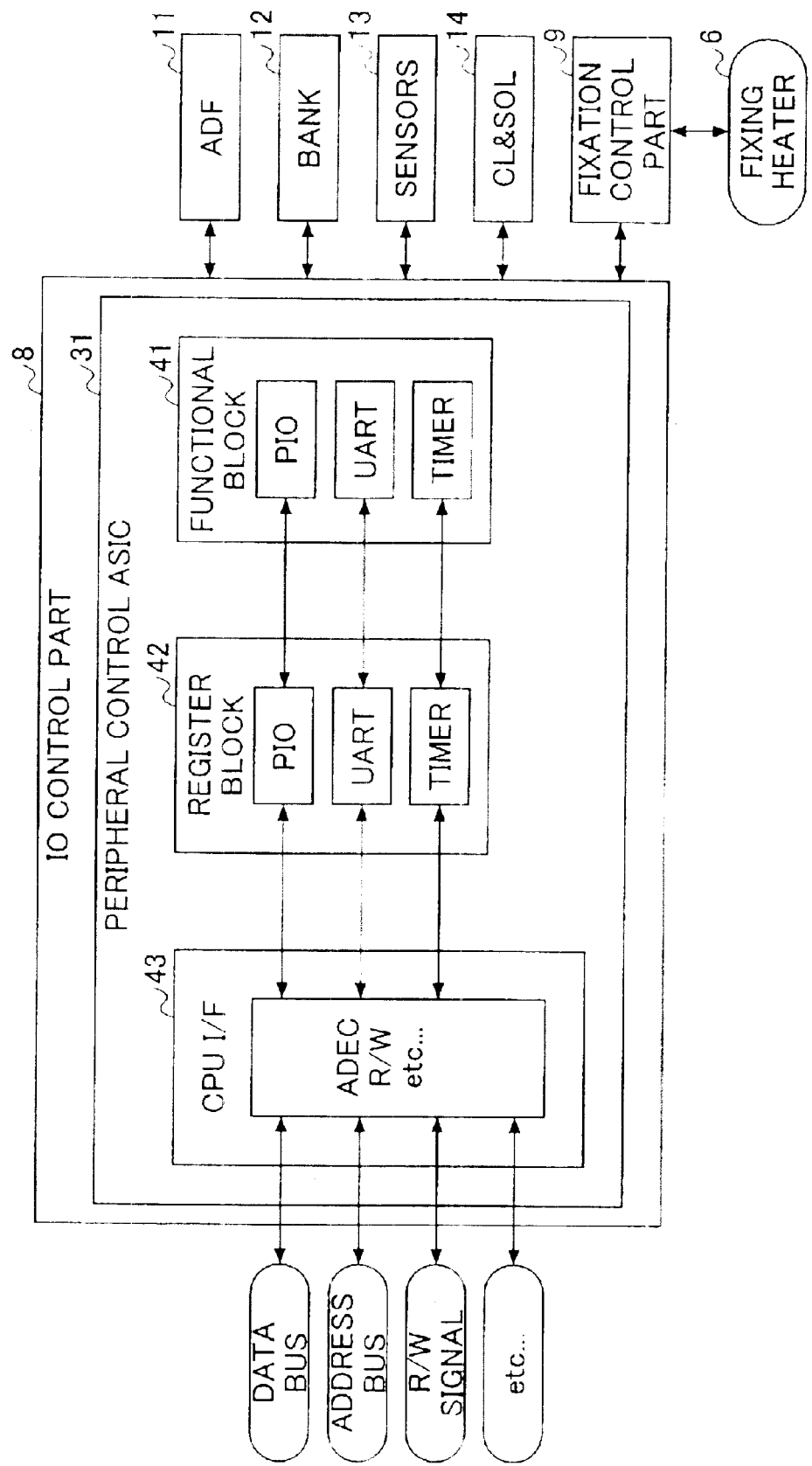
FIG. 3 is a block diagram of a peripheral control ASIC shown in FIG. 2.
Figure 6:
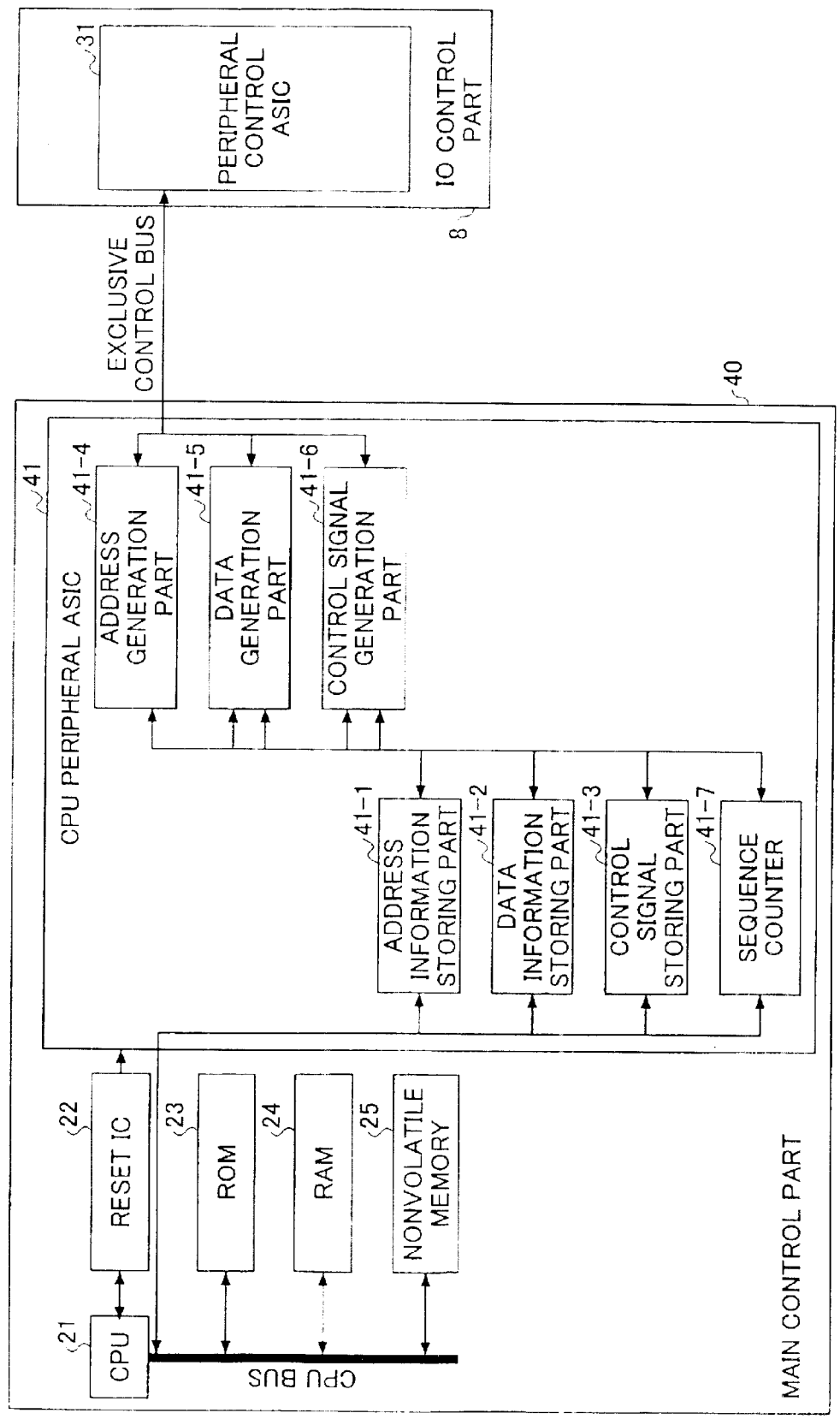
FIG. 6 is a block diagram of a structure of a main control part and an IO control part provided in an image forming apparatus according to a first embodiment of the present invention

FIG. 6 is a block diagram showing a structure of a main control part 40 and an IO control part 8 provided in an image forming apparatus according to the first embodiment of the present invention. In FIG. 6, parts that are the same as the parts shown in FIG. 2 are given the same reference numerals, and descriptions thereof will be omitted.

After power is turned on, a CPU 21 of the main control part 40 starts a series of operations upon cancellation of a reset signal generated by a reset IC 22 in accordance with a control program stored in a ROM 23. A RAM 24 is used as a work area of the control program. Adjustment data of the image forming apparatus, history of use, and the like are stored in a nonvolatile memory 25, and the stored data is used for maintenance. Since the CPU 21 has a general-purpose specification, the control program initializes the CPU 21 first after start of the operation. Additionally, since there are many cases where the contents of the RAM 24 are unfixed immediately after a power is turned on, the RAM 24 is initialized according to ALL"0" or ALL"1" write after the initialization of the CPU 21. Further, since a CPU peripheral ASIC 41 also has a general-purpose specification, the CPU peripheral ASIC 41 is initialized after the initialization of the RAM 24.

In the present embodiment, the peripheral control ASIC 31 is initialized through an exclusive control bus in parallel to the above-mentioned initialization of the CPU 21, the RAM 24 and the CPU peripheral ASIC 41 according to the control program.

A description will be given below of the initialization of the peripheral control ASIC 31.

With cancellation of the reset signal generated by the reset IC 22, the CPU peripheral ASIC 41 acquires addresses, data and control signals which should be set up as initial values of the peripheral control ASIC 31 through an address information storing part 41-1, a data information storing part 41-2 and a control signal storing part 41-3. The acquired addresses, data and control signals are supplied to an address generation part 41-4, a data generation part 41-5 and a control signal generation part 41-6, respectively.

The data supplied to the address generation part 41-4, the data generation part 41-5 and the control signal generation part 41-6 is output to an exclusive control bus, and are supplied to a peripheral control ASIC 31 through the exclusive control bus. Then, the thus-supplied data is set at a predetermined address in the peripheral control ASIC 31 as initial values. Since the initial values to be set are present at a plurality of addresses, the data in each storing part is set to the corresponding generation part according to operations of the sequence counter 41-7, and the peripheral control ASIC 31 is initialized sequentially through the exclusive control bus.

Figure 7:
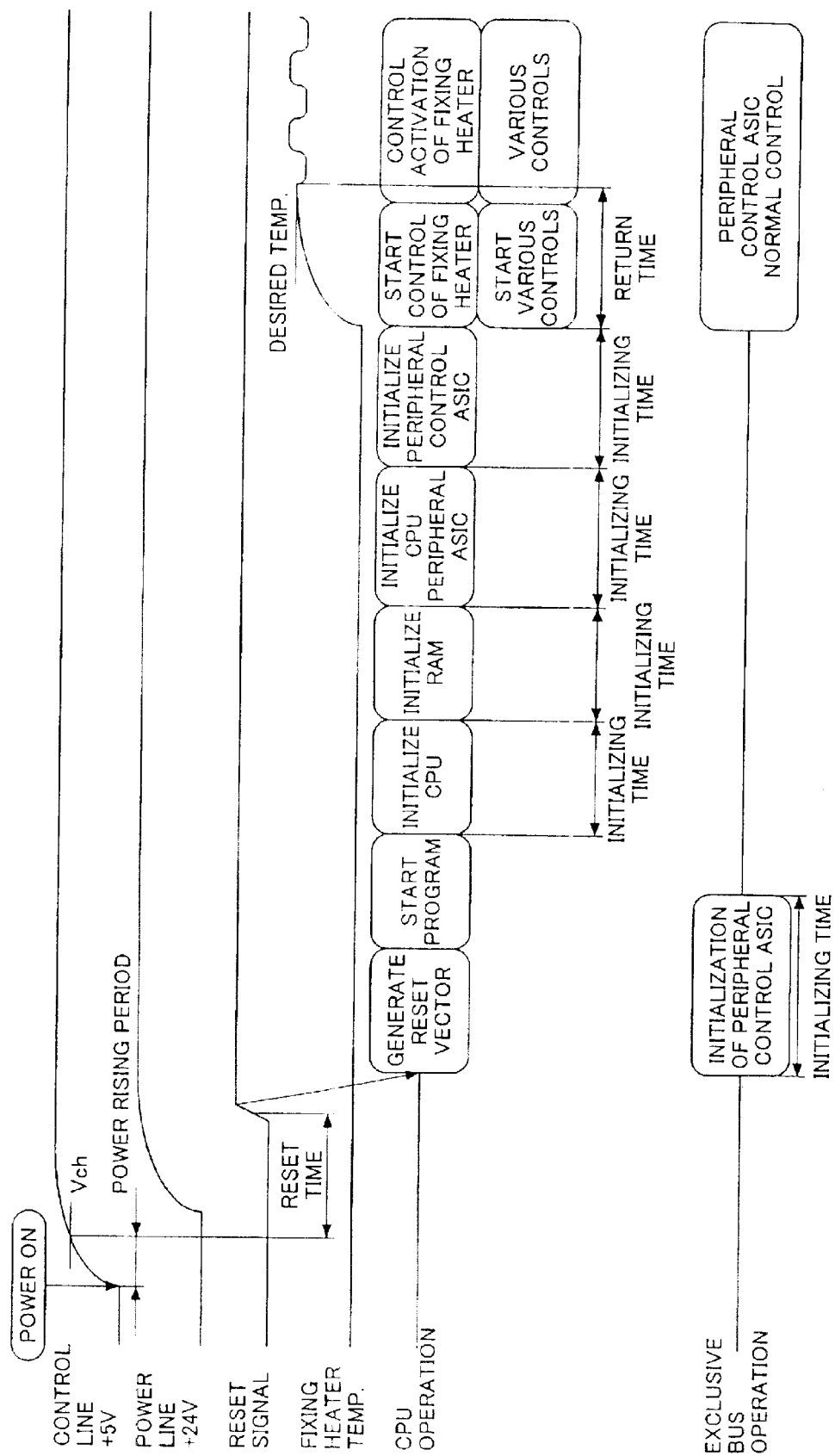
FIG. 7 is a time chart showing an initializing process according to the first embodiment.

FIG. 7 is a time chart showing a process according to the first embodiment after power is turned on and until a control operation of activation of the fixing heater through a series of initializing operations. Comparing the process shown in FIG. 7 with the conventional process shown in FIG. 4, it can be appreciated that the system return time is reduced by performing the initialization of the peripheral control ASIC 31 parallel to the initialization of other parts.

Additionally, FIG. 8 is an illustration showing an example of a time required for each operation in the process shown in FIG. 7. As shown in FIG. 8, the system return time of the process according to the present embodiment is shorter than that of the conventional process by 1.0 second, which corresponds to the initializing time of the peripheral control ASIC 31. Since it takes 9.1 seconds from turning power on to the activation control operation of the fixing heater in the conventional process when the return time of the fixing heater is short, the above-mentioned reduction of the time of 1.0 second is an improvement exceeding 10%.

Figure 9:
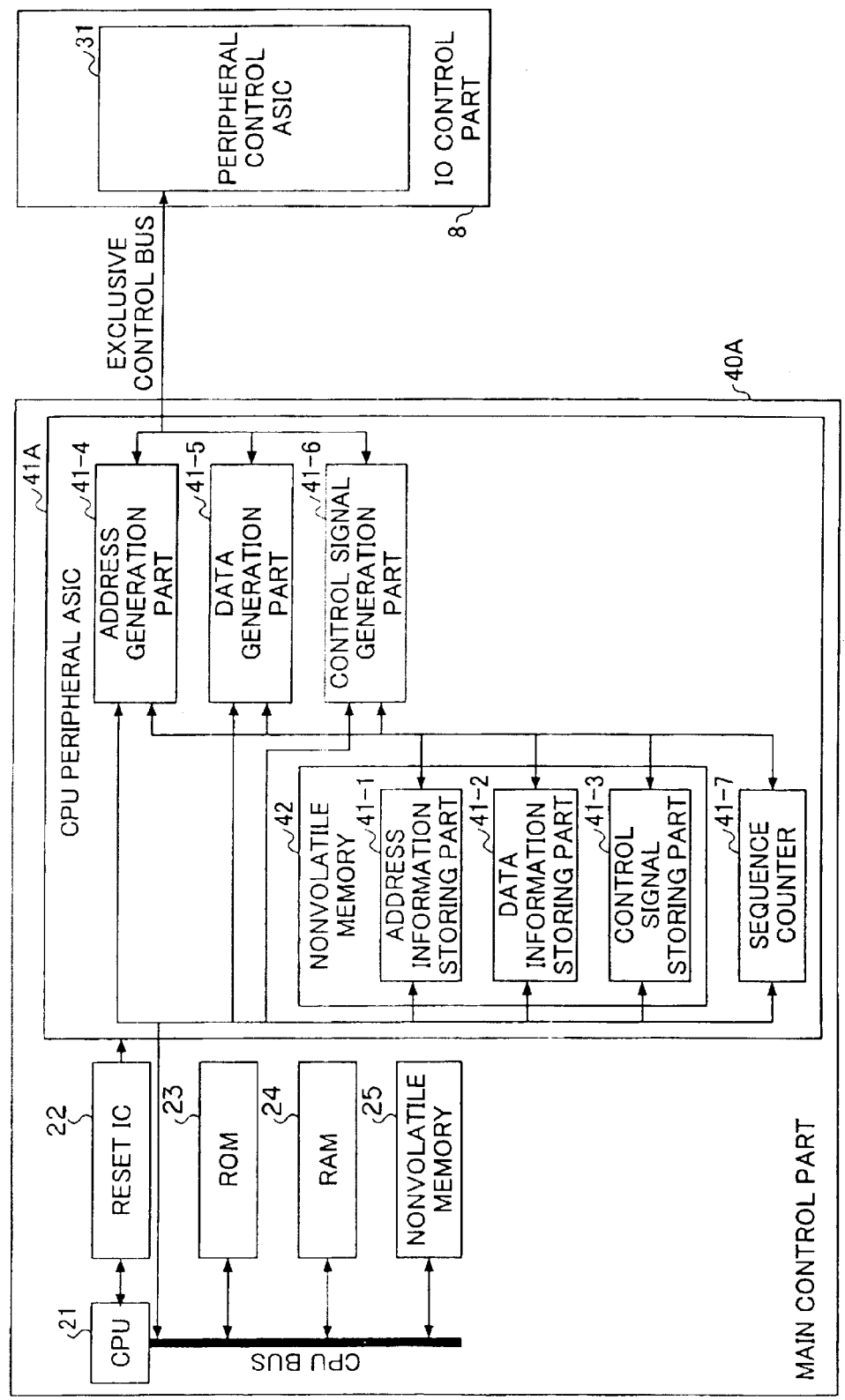
FIG. 9 is a block diagram of a main control part including a CPU peripheral ASIC according to a first variation of the first embodiment shown FIG. 6.

FIG. 9 is a block diagram of a main control part 40A including a CPU peripheral ASIC 41A according to a first variation of the first embodiment shown in FIG. 6. In FIG. 9, parts that are the same as the parts shown in FIG. 6 are given the same reference numerals, and descriptions thereof will be omitted. In the first variation, the address information storing part 41-1, the data information storing part 41-2, and the control signal storing part 41-3 in the CPU peripheral ASIC 41A are formed in a nonvolatile memory 42 so that information stored in each part is rewritable by the control program.

Depending on a system, even if the same hardware structure is used, there may be a case where it is desirable to adjust the initial values of the peripheral control ASIC 31 at the time of turning power on. For example, when the ADF 11 and the BANK 12, which are options, are not connected, the return time can be further reduced by eliminating the initializing operations of the interface parts corresponding to those parts. Additionally, there may be a case where it is desired to vary the initial state of a display part depending on a system.

Accordingly, as mentioned above, the data supplied through the exclusive control bus is generated by the control information stored in the nonvolatile memory 42, and the control information in the nonvolatile memory 42 is made rewritable by the control program. Thereby, the initial state of the peripheral control ASIC 31 can be changed at the time of turning a power on, which results in a further reduction in the return time.

Figure 10:
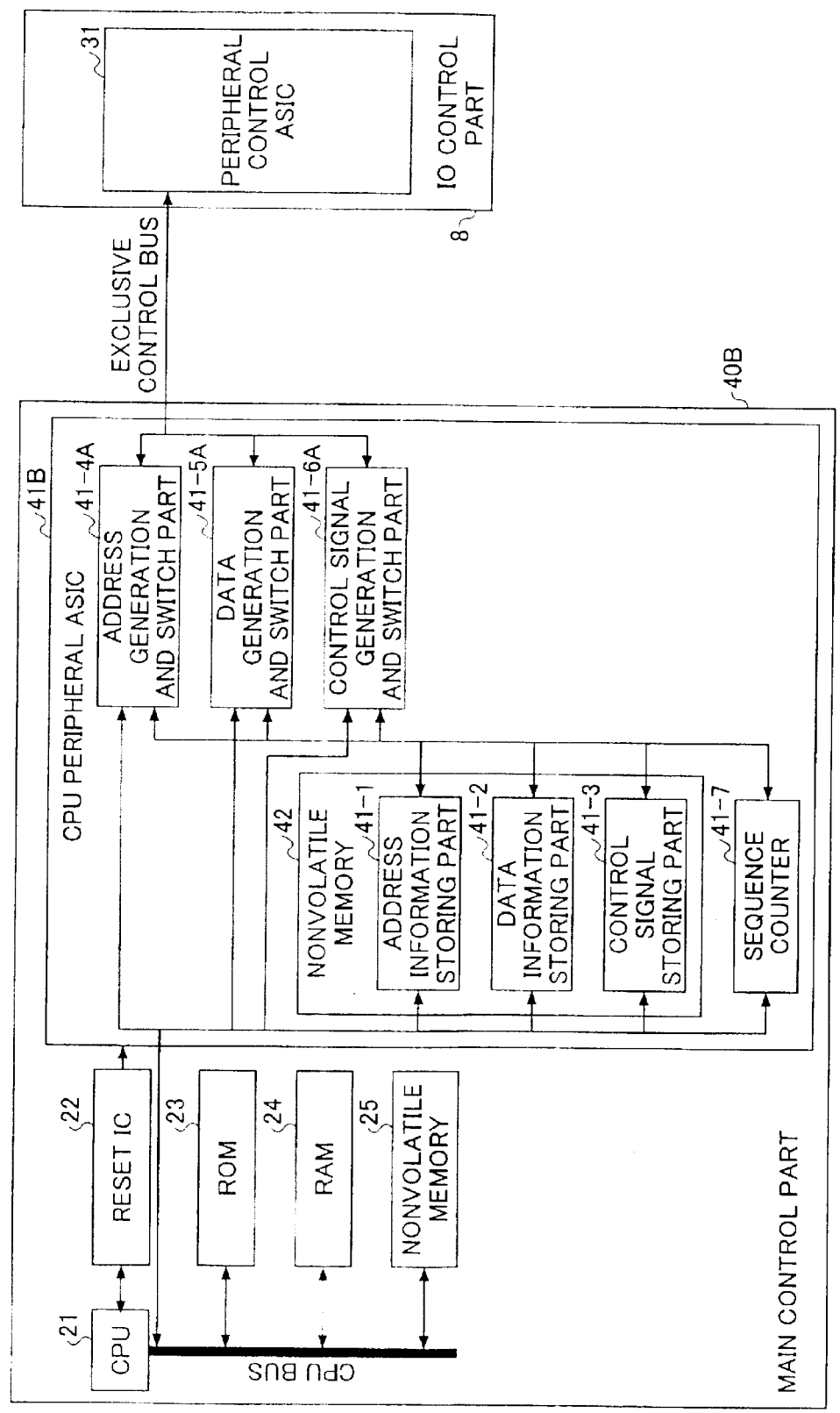
FIG. 10 is a block diagram of a main control part including a CPU peripheral ASIC according to a second variation of the first embodiment shown FIG. 6.

FIG. 10 is a block diagram of a main control part 40B including a CPU peripheral ASIC 41B according to a second variation of the first embodiment shown in FIG. 6. In FIG. 10, parts that are the same as the parts shown in FIG. 9 are given the same reference numerals, and descriptions thereof will be omitted. In the second variation, the address generation part 41-4, the data generation part 41-5, and the control signal generation part 41-6 of the CPU peripheral ASIC 41A shown in FIG. 9 are replaced by an address generation and switch part 41-4A, a data generation and switch part 41-5A, and a control signal generation and switch part 41-6A, respectively, so that the connection of the exclusive control bus can be switched between the CPU bus and a control bus generated based on the control information in the nonvolatile memory 42.

That is, there is a case in which the peripheral control ASIC 31 is controlled based on the control information stored in the nonvolatile memory 42 even after the initialization is completed. In such a case, there must be taken the steps of 1) rewriting the control information by CPU 21→2) generating control bus information→3) controlling the peripheral control ASIC 31. However, the process of these steps may decrease the processing speed of the entire control system.

In this case, the processing speed can be increased, after the initialization is completed, by taking the steps of 1) rewriting the control information by the CPU 21→2) controlling the peripheral control ASIC 31. Accordingly, as shown in FIG. 10, an improvement in the processing speed of the entire control system can be achieved by enabling the connection of the exclusive control bus, which is connected to the peripheral control parts, to be switched between the control bus (CPU bus) controlled by the operation processing unit (CPU 21) and the control bus produced based on the control information in nonvolatile memory 42.

Figure 11:
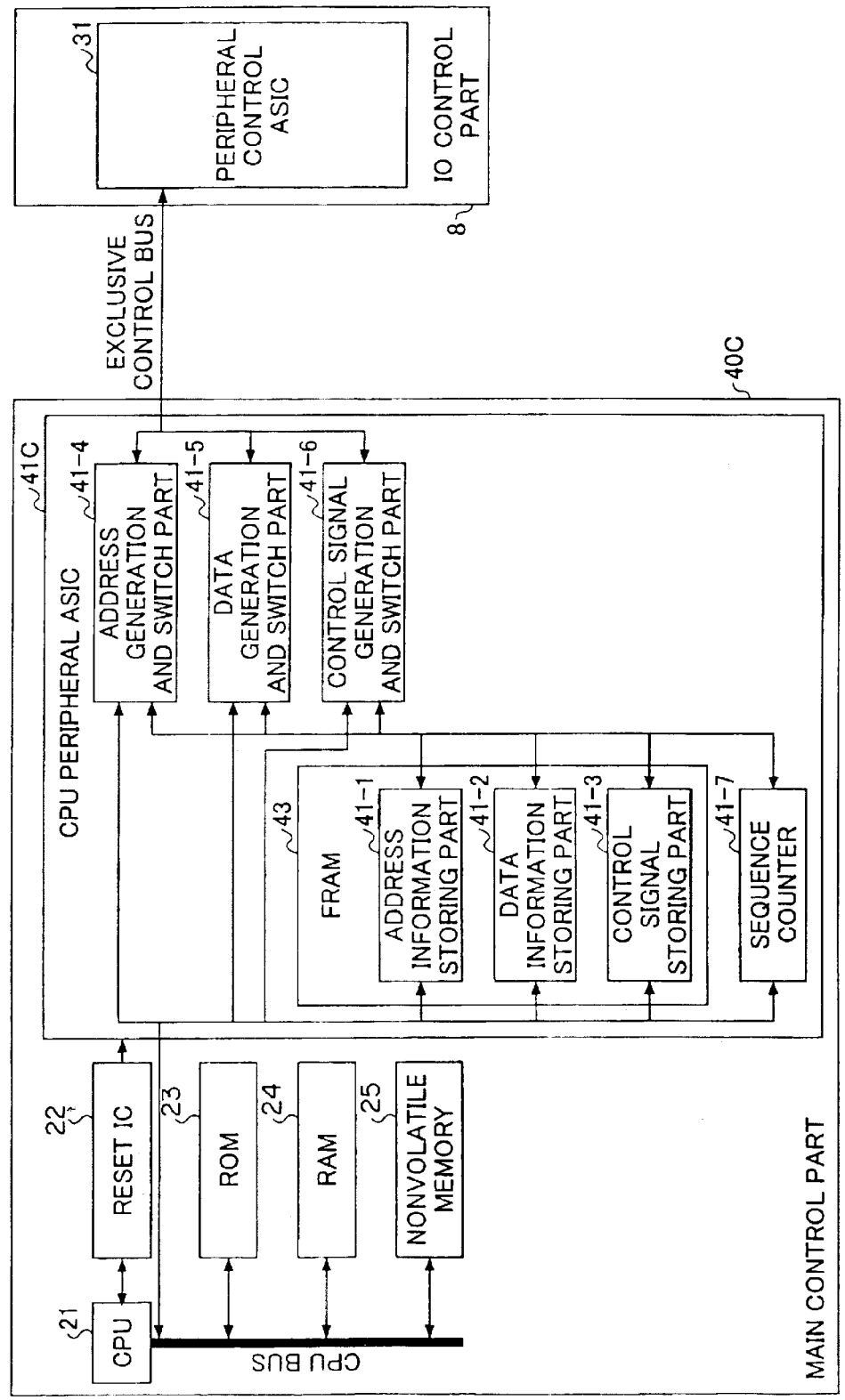
FIG. 11 is a block diagram of a main control part including a CPU peripheral ASIC according to a third variation of the first embodiment shown FIG. 6.

FIG. 11 is a block diagram of a main control part 40C including a CPU peripheral ASIC 41C according to a third variation of the first embodiment shown in FIG. 6. In FIG. 11, parts that are the same as the parts shown in FIG. 10 are given the same reference numerals, and descriptions thereof will be omitted. In the third variation, the address information storing part 41-1, the data information storing part 41-2, and the control signal storing part 41-3 in the CPU peripheral ASIC 41C are formed in a ferroelectric random access memory (FRAM) 43.

That is, if the nonvolatile memory 42 is constituted by an electrically erasable and programmable read only memory (EEPROM), a number of rewrite operations should be limited to 105 times or less, which may deteriorate a user's convenience. However, the limitation in the number of rewriting operations can be remarkably increased (more than 1012 times) by constituting the nonvolatile memory 42 by the FRAM 43 as shown in FIG. 11. Thus, an image forming apparatus, which does not deteriorate a user's convenience, can be achieved.

Second Embodiment

Figure 12:
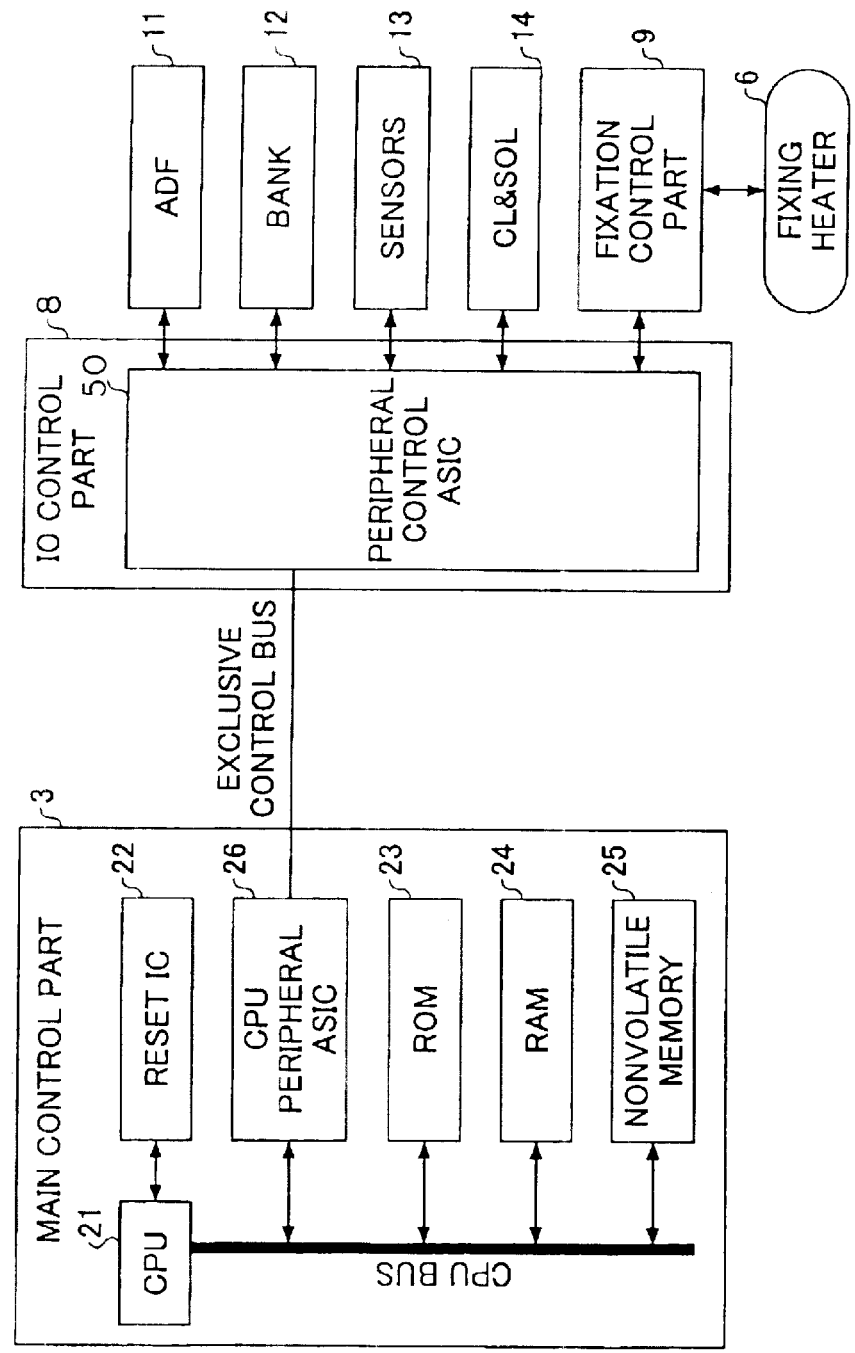
FIG. 12 is a block diagram of an image forming apparatus according to a second embodiment of the present invention.

A description will now be given, with reference to FIGS. 12 through 15, of a second embodiment of the present invention. FIG. 12 is a block diagram of an image forming apparatus according to the second embodiment of the present invention.

Figure 1:
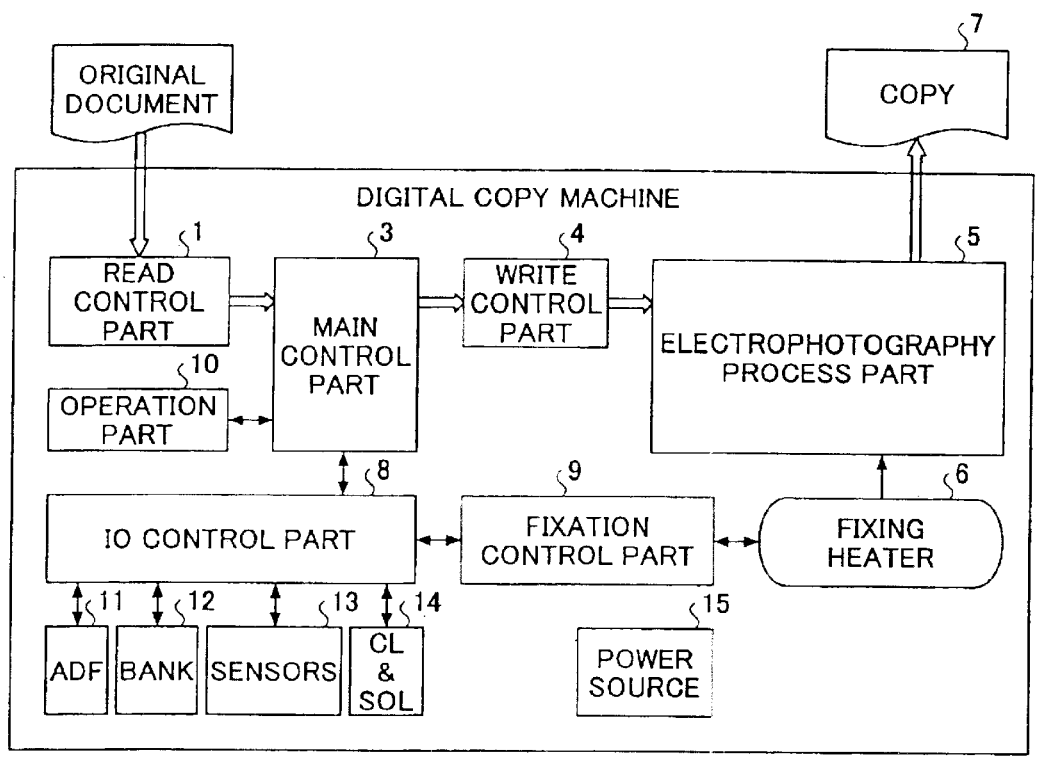
FIG. 1 is a block diagram of a digital copy machine as a conventional image forming apparatus.

The fundamental structure of the image forming apparatus according to the second embodiment of the present invention shown in FIG. 12 is the same as the structure shown in FIGS. 1 and 2, and a description thereof will be omitted.

In the conventional image forming apparatus shown in FIG. 1, the initialization of the peripheral control ASIC 31 is carried out after the initialization of the CPU 21 and the reset IC 22 is completed, and, thus, the initializing process of the entire system takes a long time. On the other hand, a peripheral control ASIC 50 provided in the image forming apparatus according to the second embodiment of the present invention eliminates such a problem.

Figure 13:
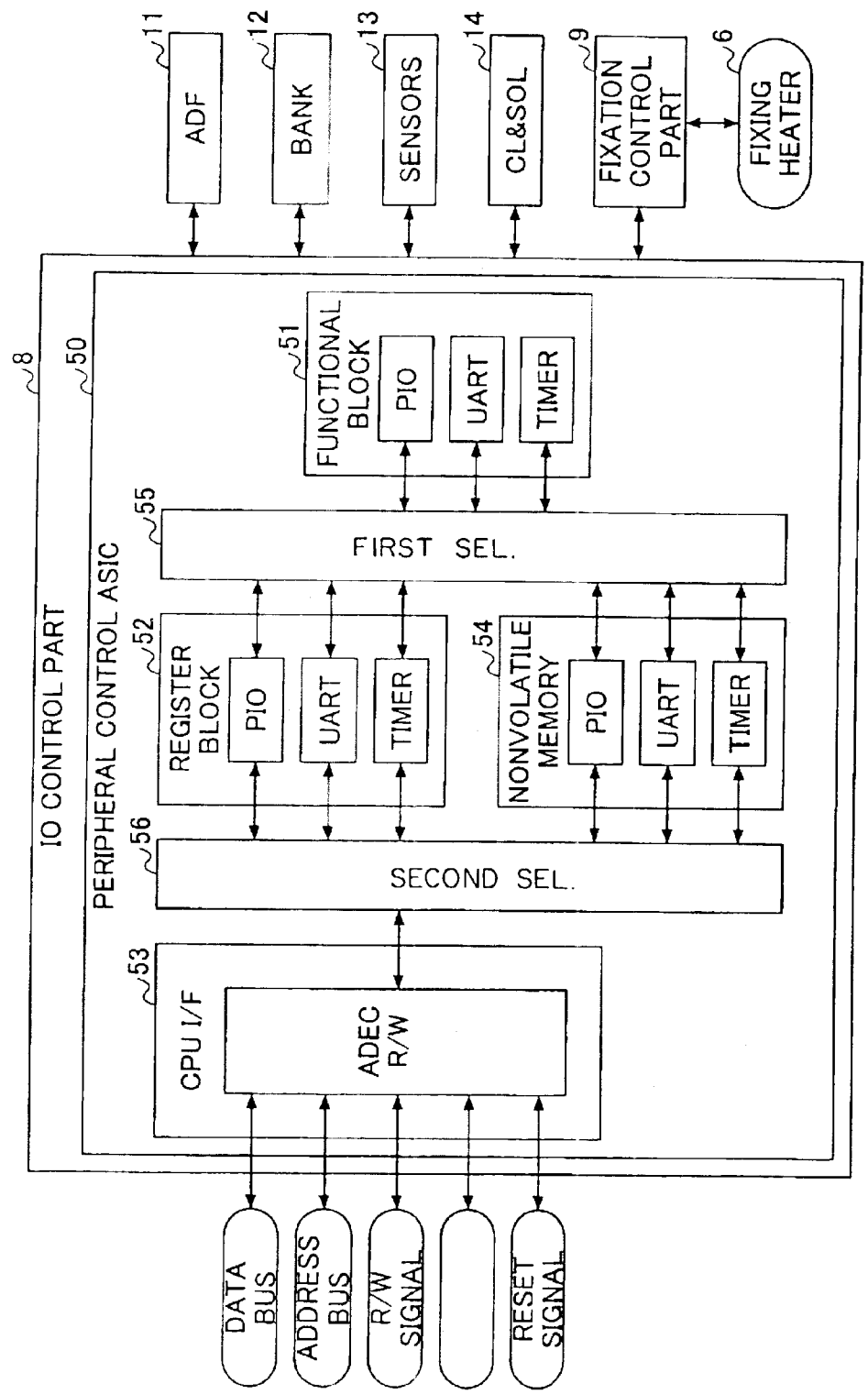
FIG. 13 is a block diagram of a peripheral control ASIC according to the second embodiment of the present invention.

A description will now be given, with reference to FIG. 13, of an initializing process with the peripheral control ASIC 50. FIG. 13 is a block diagram of the peripheral control ASIC 50 according to the second embodiment of the present invention.

The peripheral control ASIC 50 is provided in the IO control part 8 show in FIG. 1. The peripheral control ASIC 50 comprises a functional block 51, a register block 52, a CPU I/F 53, a nonvolatile memory 54, a first selector 55, and a second selector 56. The functional block 51 realizes functions such as PIO, a UART, and a timer. The register block 52 sets up various settings and operation controls for the functional block 51. The CPU I/F 53 is connected to the control buses, such as an address bus and a data bus, so as to perform decoding of the internal address decoder and an access control to the register block 52. The nonvolatile memory 54 sets up and stores information regarding the initial state of the functional block 51 beforehand at a factory or the like. The first selector 55 selectively supplies to the functional block 51 one of the control data from the register block 52 and the control data from the nonvolatile memory 54. The second selector 56 selectively supplies the control data from the CPU I/F 53 to one of the register block 52 and the nonvolatile memory 54.

At the time of turning power on, the control data to the functional block 51 is supplied from the nonvolatile memory 54 by being switched by the first selector 55. Since the initial state of the functional block 51 is beforehand set up in the nonvolatile memory 54 at a factory or the like by the CPU I/F 53 with the operation of the second selector 56, the functional block 51 can operate with desired initial values. After the initialization of each part such as the CPU 21, the RAM 24, of the main control part 3 is completed and being set in a normal control state, and when an access of the CPU 21 to the peripheral control ASIC 50 is performed, the control data is supplied from the CPU I/F 53 to the register block 52 through the second selector 56. Then, the control data supplied to the functional block 51 is switched to the control data supplied from the register block 52, and a normal control is performed.

Figure 14:
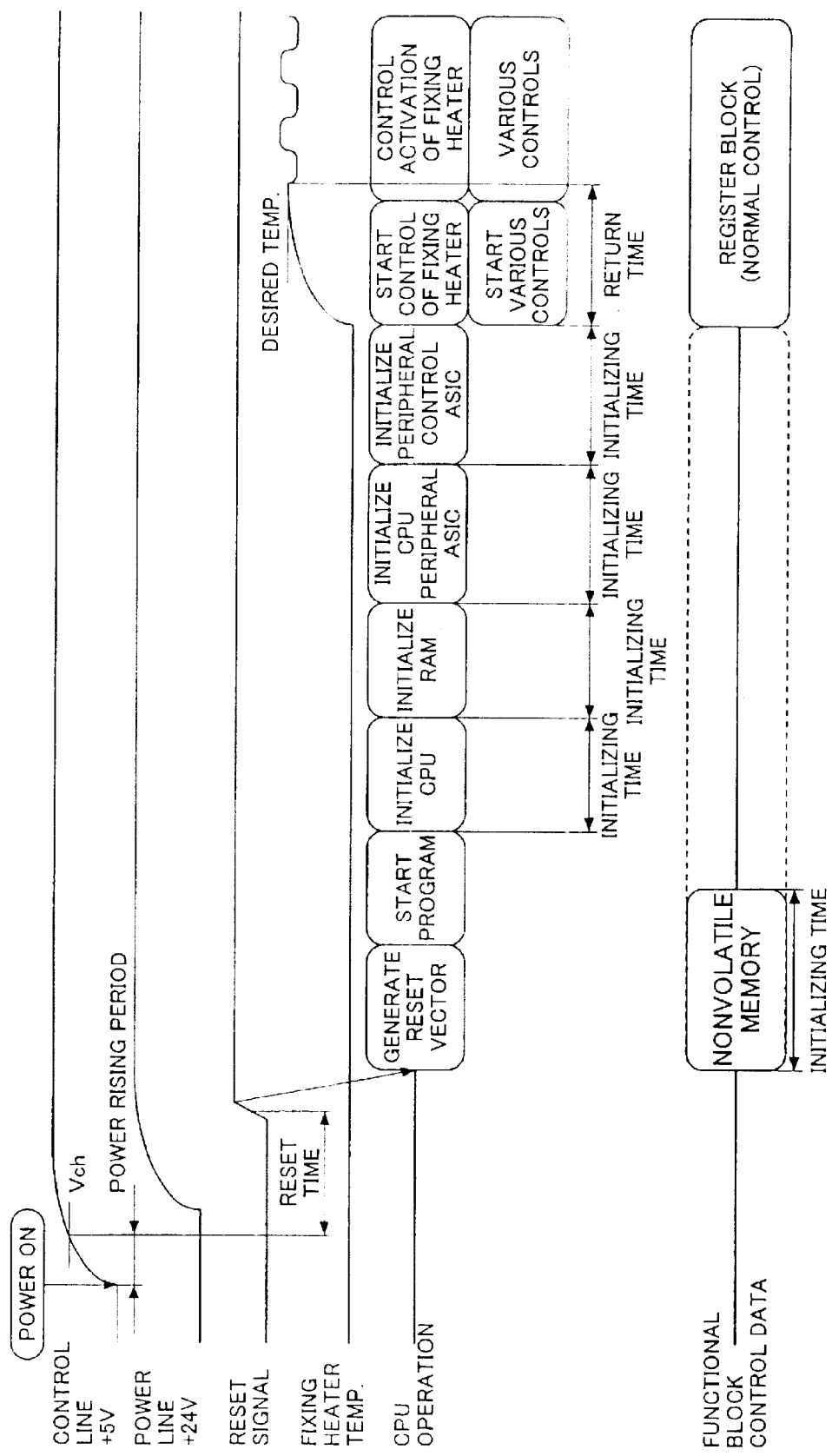
FIG. 14 is a time chart of an initializing process according to the second embodiment.

It should be noted that FIG. 14 shows a time chart of a process from a time of turning a power on to an activation control of the fixing heater 6 through the series of initializing operations according to the present embodiment. Additionally, FIG. 15 shows an example of the time required for each operation in the process shown in FIG. 14.

A description will now be given, with reference to FIGS. 16 and 17, of a first variation of the above-mentioned second embodiment.

Figure 16:
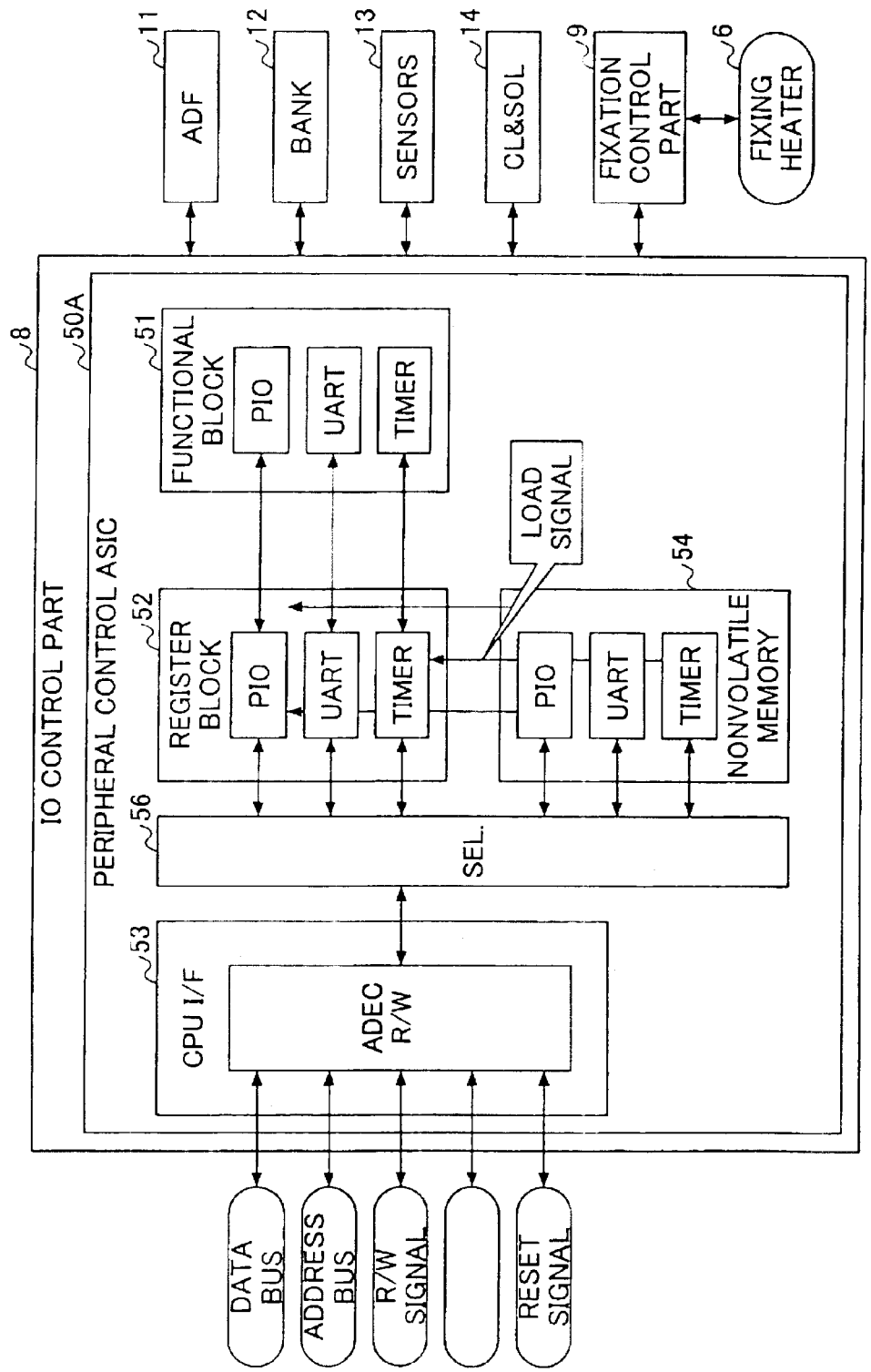
FIG. 16 is a block diagram of a peripheral control ASIC according to a first variation of the second embodiment of the present invention.

FIG. 16 is a block diagram of a peripheral control ASIC 50A according to the first variation of the second embodiment of the present invention. In the first variation, the first selector 55 is not provided in the peripheral control ASIC 50A. Instead, a load signal is generated and supplied to the register block 52 from the nonvolatile memory 54 with an input of the reset signal to the CPU I/F 53. Thereby, the initial values of the control data of the functional block 51, which are beforehand set up and stored in the nonvolatile memory 54 at a factory or the like, are stored in the register block 52.

After cancellation of the reset, the apparatus is operated by a normal control operation. Therefore, when an access is made to the peripheral control ASIC 50A from the CPU 21, the control data from the CPU I/F 53 is supplied to the register block 52 through the second selector 56. Accordingly, the functional block 51 is controlled based on the control data supplied from the CPU I/F 53.

Figure 17:
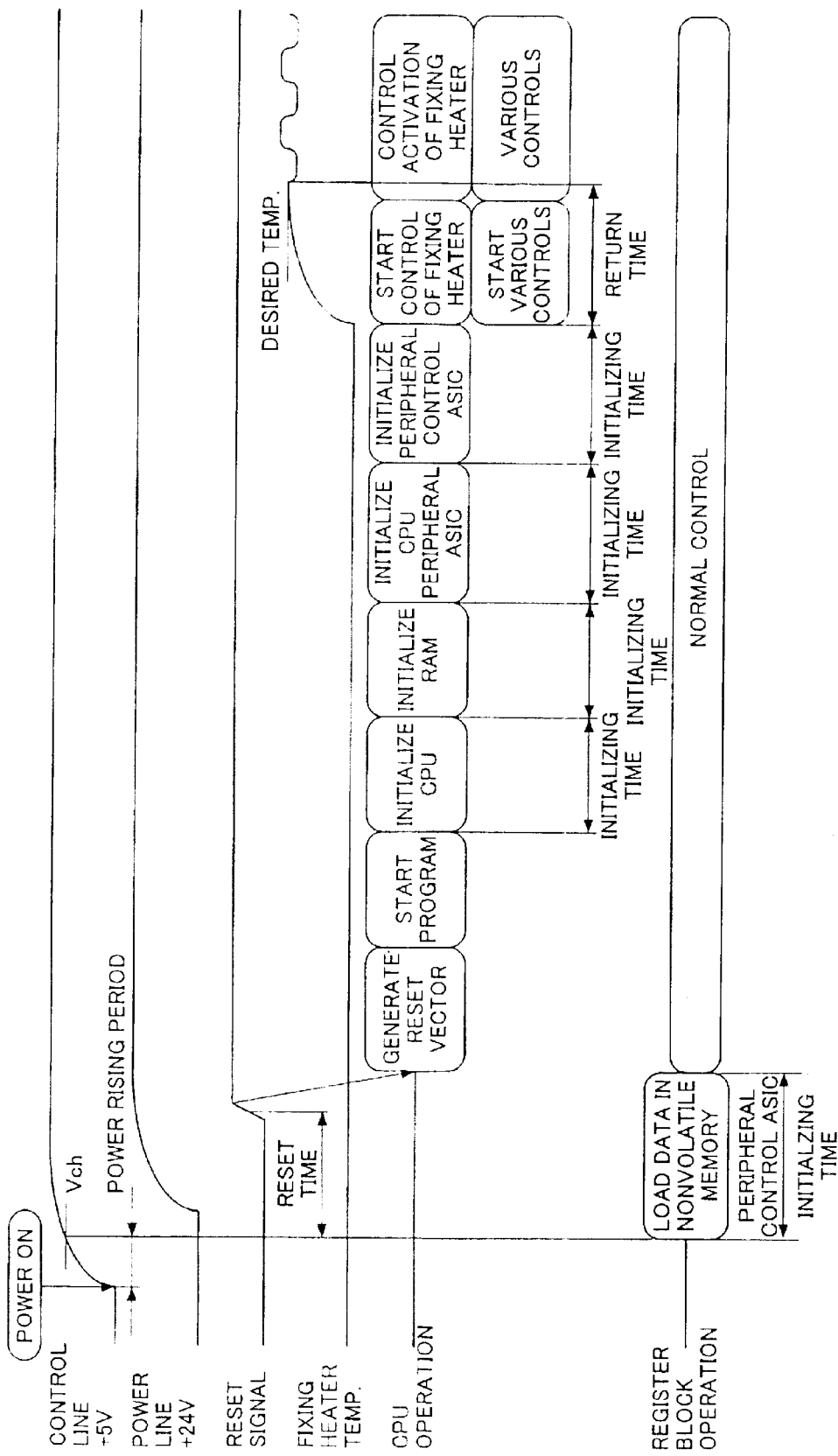
FIG. 17 is a time chart of an initializing process according to a first variation of the second embodiment of the present invention.

It should be noted that FIG. 17 shows a time chart of a process from a time of turning a power on to an activation control of the fixing heater 6 through the series of initializing operations according to the first variation of the second embodiment of the present invention. Additionally, a time required for each operation is the same as that of the example shown in FIG. 15.

Figure 18:
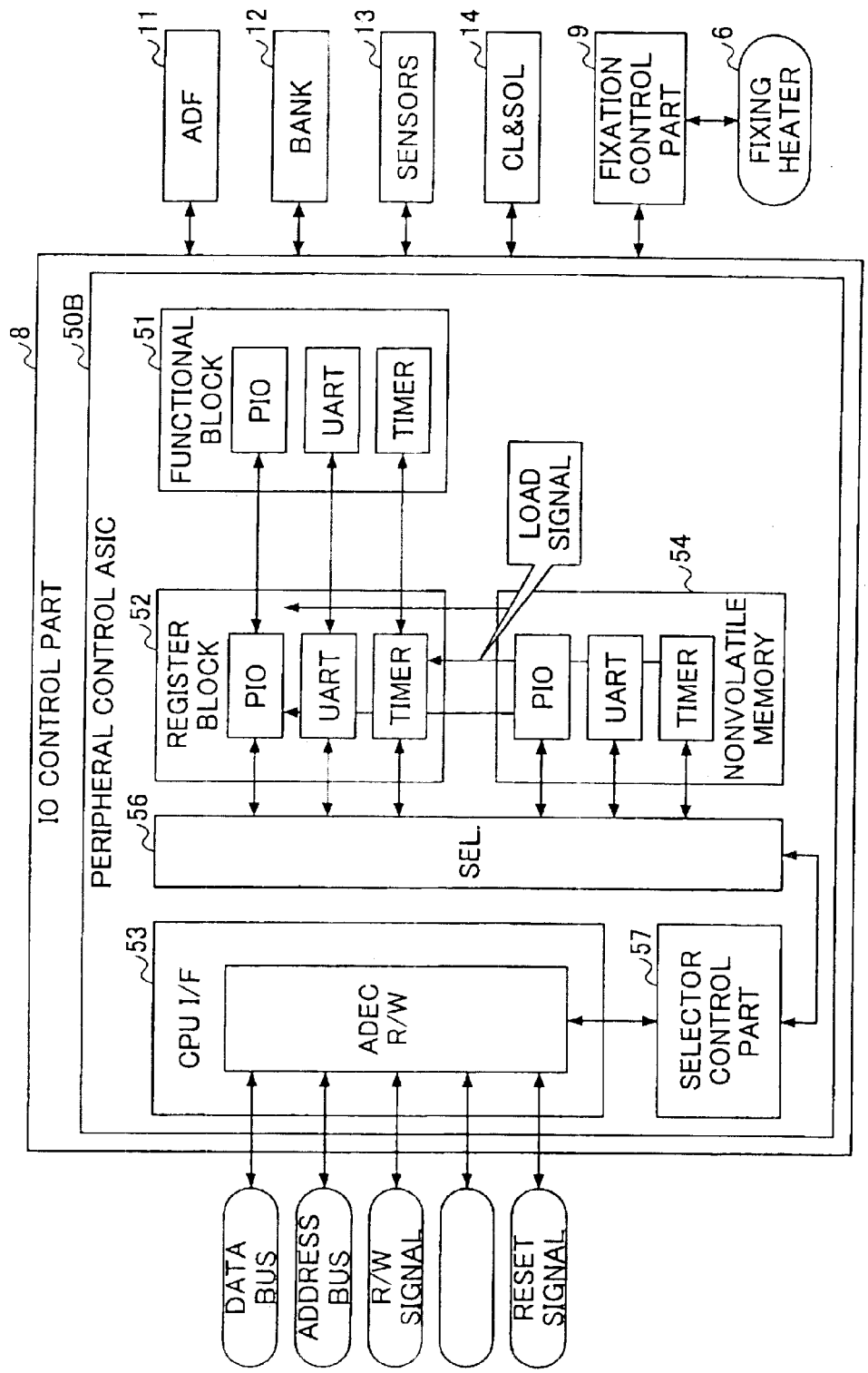
FIG. 18 is a block diagram of a peripheral control ASIC according to a second variation of the second embodiment of the present invention.

FIG. 18 is a block diagram of a peripheral control ASIC 50B according to a second variation of the second embodiment of the present invention. In the second variation, a selector control part 57 is added to the structure of the first variation shown in FIG. 16.

The second selector 56 switches the supply of the control data from the CPU I/F 53 to one of the register block 52 and the nonvolatile memory 54. The selection of data path is performed based on the contents of setting in the selector control part 57. When the register block 52 is selected in the selector control part 57, an access from the CPU 21 through the CPU I/F 53 is made to the register block 52.

On the other hand, when the nonvolatile memory 54 is selected in the selector control part 57, an access from the CPU 21 is made to the nonvolatile memory 54.

If a memory space of a register used for controlling each function (PIO, UART, timer) of the functional block 51 is set to 0x040000 address, respectively, a number of address lines required for the control of the register block 52 is A 19:0, that is, a total of 20 lines (controllable up to 0x0FFFFF). When the selector control is not performed, further address lines to the nonvolatile memory 54 are required, which may increase the number of address lines required for the peripheral control ASIC 50B is increased. However, in the present variation, there are no additional address lines needed since the access switch is performed through the selector control part 57.

FIGS. 19, 20A and 20B show an example of a CPU memory map representing the above-mentioned structure. FIG. 19 shows a memory map of the entire CPU 21. FIG. 20A shows a memory map of the CPU 21 with respect to the peripheral control ASIC 50B when an access is made to the register block 52. FIG. 20B shows a memory map of the CPU 21 with respect to the peripheral control ASIC 50B when an access is made to the nonvolatile memory 54.

On the other hand, if it is desirous to change the initial values at the time of turning power on from the next time by setting by a user, the selector control part 57 is switched to the nonvolatile memory 54 side so as to update the data in the nonvolatile memory 54. Since data is loaded to the register block 52 from the nonvolatile memory 54 from the next time of turning a power on, the apparatus can be operated with new setting values. In such a case, there is no need to change in software the addresses in the nonvolatile memory 54 which is for setting initial values, and in the register block 52, which is for a normal control, the control by the software becomes easy.

Figure 21:
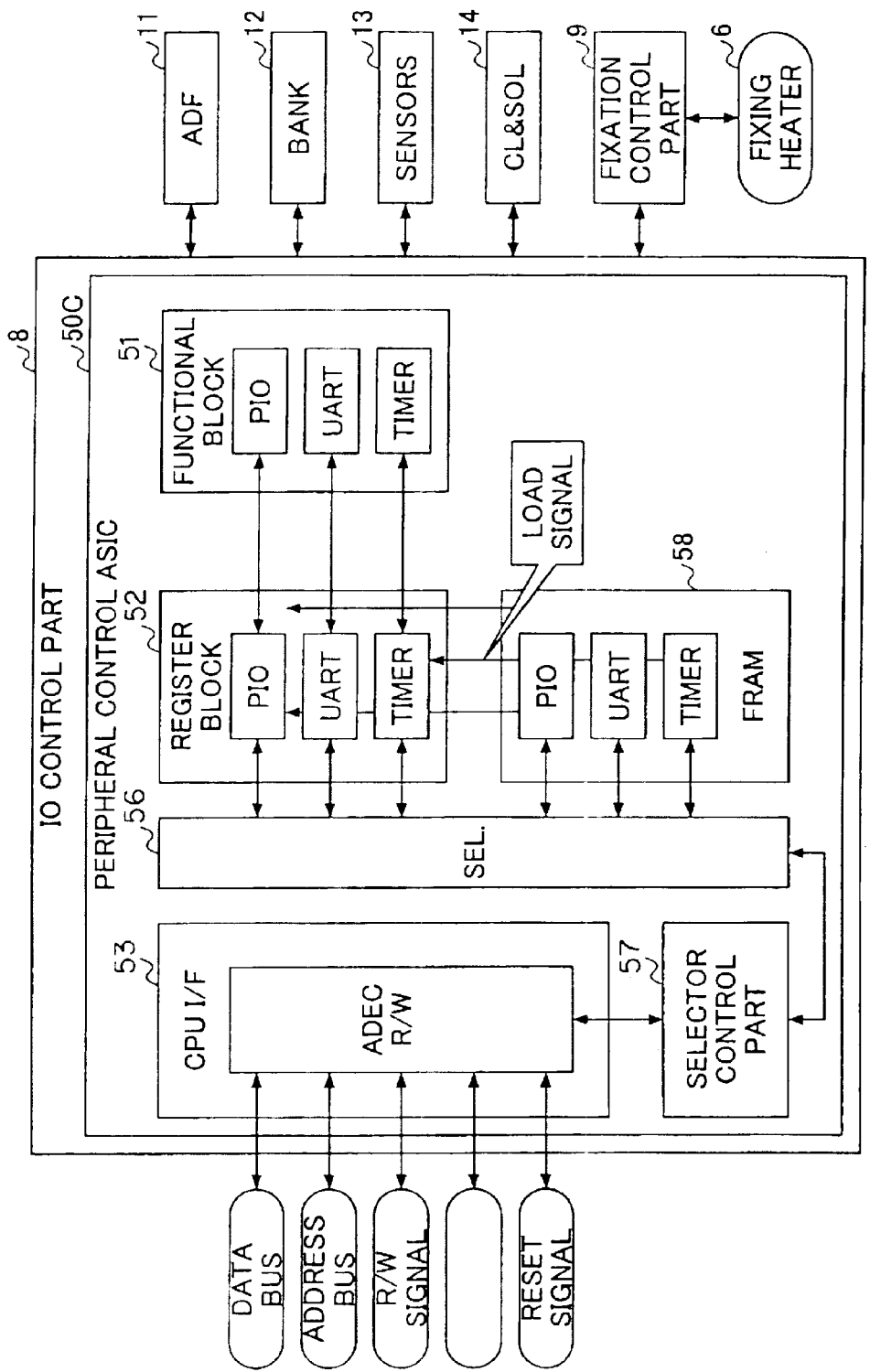
FIG. 21 is a block diagram of a peripheral control ASIC in which a nonvolatile memory is constituted by a ferroelectric random access memory.

It should be noted that, as shown in FIG. 21, a peripheral control ASIC 50C in which the nonvolatile memory is constituted by a ferroelectric random access memory (FRAM) 58. Since the number of times of rewriting the ferroelectric random access memory 58 is large, it can remarkably increase the number of times of updating initial values and the like of the apparatus operation.

The present invention is not limited to the specifically disclosed embodiments, and variations and modifications may be made without departing from the scope of the present invention.

What is claimed is:

1. An image forming apparatus using an electrophotographic process to form an image, comprising:

a processing unit configured to control the image forming apparatus;

a control bus for address and data, which is controlled by said processing unit;

a memory connected to the control bus and configured to store a control program of said processing unit;

a reset part configured to initialize said processing unit when power is turned on;

a peripheral control part configured to control each part of said image forming apparatus in accordance with an instruction of said processing unit; and an exclusive control bus connected to the peripheral control part, wherein an operation of said exclusive control bus is started according to an input from said reset part so as to perform an initializing process of said peripheral control part.

2. The image forming apparatus as claimed in claim 1, wherein said exclusive control bus is produced based on control information stored in a nonvolatile memory.

3. The image forming apparatus as claimed in claim 2, wherein said exclusive control bus is selectively connected to one of the control bus controlled by said processing unit and another control bus produced based on the control information stored in said nonvolatile memory.

4. The image forming apparatus as claimed in claim 2, wherein said nonvolatile memory is a ferroelectric random access memory.

5. An image forming apparatus using an electrophotographic process to form an image, comprising:

processing means for performing a control of the image forming apparatus;

a control bus for address and data, which is controlled by said processing means;

memory means connected to the control bus for storing a control program of said processing means;

reset means for initializing said processing means when power is turned on;

peripheral control means for controlling each part of said image forming apparatus in accordance with an instruction of said processing means; and an exclusive control bus connected to the peripheral control means, wherein an operation of said exclusive control bus is started according to an input from said reset means so as to perform an initializing process of said peripheral control means.

6. The image forming apparatus as claimed in claim 5, wherein said exclusive control bus is produced based on control information stored in a nonvolatile memory.

7. The image forming apparatus as claimed in claim 6, wherein said exclusive control bus is selectively connected to one of the control bus controlled by said processing means and another control bus produced based on the control information stored in said nonvolatile memory.

8. The image forming apparatus as claimed in claim 6, wherein said nonvolatile memory is a ferroelectric random access memory.

9. An image forming apparatus, comprising a processing unit controlling the entire image forming apparatus and an integrated circuit controlling peripheral parts in accordance with an instruction of the processing unit, wherein said integrated circuit comprises:

a functional block configured to perform a predetermined function;

a register block storing setting data to the functional block; and a nonvolatile memory configured to store initial values of the setting data to said functional block separately from said register block.

10. The image formning apparatus as claimed in claim 9, further comprising a selector configured to select one of said register block and said nonvolatile memory in accordance with an instruction supplied from said processing unit when power is turned on, wherein the initial values of the setting data stored in said nonvolatile memory is loaded to said register block.

11. The image forming apparatus as claimed in claim 10, further comprising a selector control part controlling the selector which selects one of said register block and said nonvolatile memory to be accessed by said processing unit when an access is made from said processing unit to said integrated circuit, wherein the same address is given to said register block and said nonvolatile memory in said processing unit.

12. The image forming apparatus as claimed in claim 9, further comprising a selector control part controlling a selector which selects one of said register block and said nonvolatile memory to be accessed by said processing unit when an access is made from said processing unit to said integrated circuit, wherein the same address is given to said register block and said nonvolatile memory in said processing unit.

13. The image forming apparatus as claimed in claim 9, wherein said nonvolatile memory is a ferroelectric random access memory.

14. An image forming apparatus, comprising main control means for controlling the entire image forming apparatus and peripheral control means for controlling peripheral parts in accordance with an instruction of the main control means, wherein said peripheral control means comprises:

functional means for performing a predetermined function;

register means for storing setting data to the functional means; and nonvolatile memory means for storing initial values of the setting data to said functional means separately from said register means.

15. The image forming apparatus as claimed in claim 14, further comprising:

selecting means for selecting one of said register means and said nonvolatile memory means in accordance with an instruction supplied from said main control means when power is turned on, wherein the initial values of the setting data stored in said nonvolatile memory means is loaded to said register means.

16. The image forming apparatus as claimed in claim 15, further comprising:

selector control means for controlling the selecting means which selects one of said register means and said nonvolatile memory means to be accessed by said main control means when an access is made from said main control means to said peripheral control means, wherein the same address is given to said register means and said nonvolatile memory means in said main control means.

17. The image forming apparatus as claimed in claim 14, further comprising:

selector control means for controlling selecting means for selecting one of said register means and said nonvolatile memory means to be accessed by said main control means when an access is made from said main control means to said peripheral control means, wherein the same address is given to said register means and said nonvolatile memory means in said main control means.

18. The image forming apparatus as claimed in claim 14, wherein said nonvolatile memory means is a ferroelectric random access memory.

* * * * *